United States Patent [19]

Eckert

[11] Patent Number: 4,513,703
[45] Date of Patent: Apr. 30, 1985

[54] RECIPROCATING PISTON INTERNAL COMBUSTION ENGINE

[75] Inventor: Rolf Eckert, Bergisch-Gladbach, Fed. Rep. of Germany

[73] Assignee: Klöckner-Humboldt-Deutz Aktiengesellschaft, Cologne, Fed. Rep. of Germany

[21] Appl. No.: 536,897

[22] Filed: Sep. 28, 1983

[30] Foreign Application Priority Data

Sep. 30, 1982 [DE] Fed. Rep. of Germany ....... 3236185

[51] Int. Cl.³ ............................................... F02F 1/18
[52] U.S. Cl. .............................. 123/193 CH; 123/669; 123/41.69
[58] Field of Search ................... 123/668, 669, 193 R, 123/193 H, 193 CH, 41.69

[56] References Cited

U.S. PATENT DOCUMENTS 1,825,769 10/1931 Barbarou ................ 123/193 CH
4,328,772 5/1982 Heydrich et al. .......... 123/193 CH
4,387,678 6/1983 Tholen ..................... 123/193 CH

FOREIGN PATENT DOCUMENTS 147036 6/1952 Australia ...................... 123/669
2061383 5/1981 United Kingdom ............. 123/668

Primary Examiner—Craig R. Feinberg
Attorney, Agent, or Firm—Becker & Becker

[57] ABSTRACT

A reciprocating piston internal combustion engine, each cylinder of which is provided at the connection point of light metal cylinder head and cylinder sleeve with a sealing element. On that surface which is directed toward the combustion chamber, the sealing element is provided with a heat insulating layer. This heat insulating layer serves for thermal insulation of the sealing surfaces of the light metal cylinder head and the cylinder sleeve in order to reduce thermal stresses and radial relative movements resulting from non-uniform thermal expansion characteristics. The end face inner surface of the cylinder sleeve is preferably also thermally insulated.

4 Claims, 2 Drawing Figures

RECIPROCATING PISTON INTERNAL COMBUSTION ENGINE

BACKGROUND OF THE INVENTION

The present invention relates to a reciprocating piston internal combustion engine having for each cylinder a cylinder head sealing element which is especially in the form of a metal ring, is disposed in a recess provided in a light metal cylinder head, and forms a sealing surface relative to a cylinder sleeve.

Sealing surfaces of light metal cylinder heads, which are connected with a cast-iron cylinder sleeve, due to high surface pressure and radial relative movement of cylinder head and cylinder sleeve as a result of different thermal expansion properties of light metal and cast iron, are subjected to extremely high stresses which can lead to destruction of the sealing surfaces and failure of the cylinder unit.

A cylinder for reciprocating piston internal combustion engines is known (German Patent No. 10 28 386), according to which the sealing surface of the light metal cylinder head is formed by an integrally cast heavy metal ring. Although in this way the radial relative movement at the sealing surface of cylinder head and cylinder sleeve are extensively avoided due to the nearly identical thermal expansion characteristics of the sealing ring and the cylinder sleeve, none the less considerable thermal stresses occur in the light metal cylinder head and can cause heat cracks and destruction of the cylinder head.

It is an object of the present invention to improve a cylinder of the aforementioned general type in a simple manner in such a way that thermal stresses in the light metal cylinder head are reduced.

It is a further object of the present invention that the sealing surfaces have a strength as high as possible.

BRIEF DESCRIPTION OF THE DRAWING

These objects, and other objects and advantages of the present invention, will appear more clearly from the following specification in conjunction with the accompanying drawing, in which.

SUMMARY OF THE INVENTION

Figure 1:
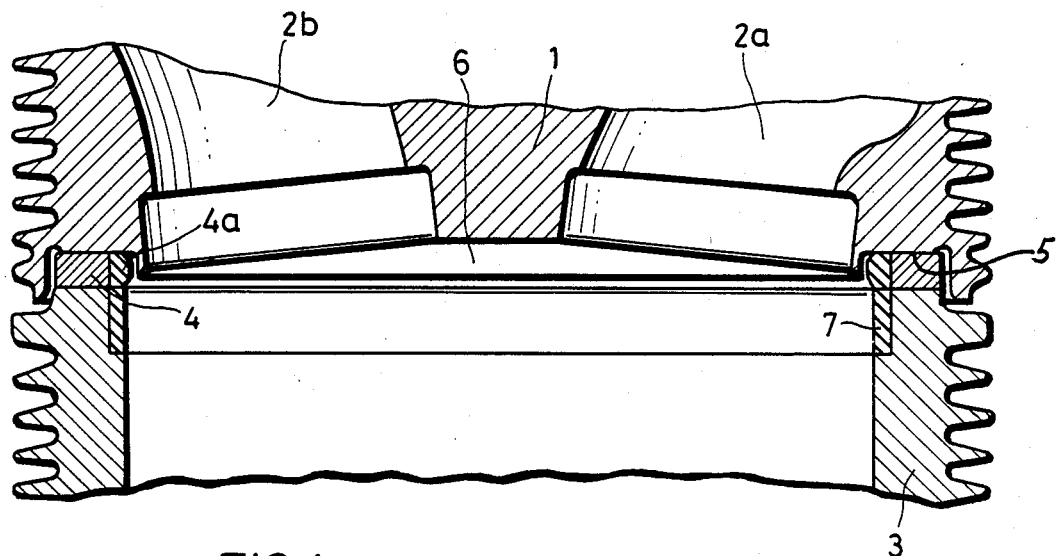
FIG. 1 is a sectioned portion through the point of connection of cylinder head and cylinder sleeve of one selected inventive embodiment of an air cooled internal combustion engine.

The internal combustion engine of the present invention is characterized primarily in that the sealing element, at least on that surface thereof directed toward the combustion chamber, is provided with a heat insulating layer.

Due to the impeded heat transfer, there is achieved on the one hand a reduction of temperature peaks, and on the other hand an equalization of the temperatures during stress reversals not only in the sealing element but also in the light metal cylinder head, so that the thermal stresses of the known cylinder, and the radial relative movements, both of which are caused by the different thermal expansions, are practically eliminated. A further important advantage of the present invention is that, due to the impeded heat transfer, the temperature of the combustion chamber can be increased, whereby the hydrocarbon emissions, which are increased especially during cold-start and partial load operation, are reduced, and furthermore the overall efficiency of an internal combustion engine which is equipped with the inventive cylinders is advantageously improved.

A ceramic material, especially aluminum titanate ($Al_2TiO_5$), is especially suitable as the heat insulating layer or coating. In the simplest embodiment, an inventive annular sealing element can be produced by cutting off a compound tube having a shrunk ceramic sleeve.

A particularly advantageous effect is achieved with the inventively proposed cylinder if the end face surface of the cylinder sleeve is provided with a heat insulating part, especially one comprising a ceramic material; this part forms a contact surface for the heat insulating layer of the sealing element. As a result, the entire sealing surface region of light metal cylinder head, sealing element, and cylinder sleeve is heat insulated in the direction of the combustion chamber, so that for example combustion chamber temperature increases during reversal of stress practically no longer have an effect on the sealing surface region, which subsequently even experiences an increase in cooling, so that a long life of the sealing surfaces is assured.

Pursuant to a further specific embodiment of the present invention, provision is made so that the contact surface side of the heat insulating layer of the sealing element which faces the cylinder sleeve, and that contact surface of the heat insulating part provided in the cylinder sleeve which faces the cylinder head, have the same cross-sectional area. It is furthermore proposed that the heat insulating layer of the sealing element, on that inner surface which faces the combustion chamber, be provided with a chamfering. This assures that the heat insulating layer of the sealing element rests on one surface with nearly uniform stability. Furthermore, due to the particularly symmetrical chamfering, the sealing element becomes an insensitive bearing part.

In order to be able to provide the sealing element with radial play in the light metal cylinder head as a result of the heat insulating layer, which is susceptible to failure, it is further proposed pursuant to the present invention that the recess for receiving the sealing element be wider than the sealing element.

DESCRIPTION OF A PREFERRED EMBODIMENT

Referring now to the drawing in detail, FIG. 1 illustrates a portion of the cylinder of an air cooled internal combustion engine at the connection point of cylinder head and cylinder sleeve. Reference numeral 1 designates a light metal cylinder head which is provided with an intake channel 2a and an exhaust channel 2b; the cylinder sleeve is designated with the reference numeral 3. For receiving the annular sealing element 4, the light metal cylinder head 1 is provided with a recess 5. In the direction of the combustion chamber 6, the sealing element 4 is provided with a ceramic heat insulating layer or inner ring 4a, which is symmetrically chamfered and rests on a ceramic heat insulating part 7 which is disposed in the inner surface on the end face of the cylinder sleeve 3.

Figure 2:
FIG. 2 is a cross section of the sealing element.

FIG. 2 is a sectioned detailed view which clearly shows the heat insulating sealing element 4 of the inventive cylinder with its layer or coating 4a.

The present invention is, of course, in no way restricted to the specific disclosure of the specification and drawing, but also encompasses any modifications within the scope of the appended claims.

What I claim is:

1. A reciprocating piston internal combustion engine, each cylinder of which comprises:
   a light metal cylinder head which is provided with a combustion chamber and with an annular shaped recess which is disposed radially outwardly of the latter;
   a cylinder sleeve having a thermal expansion differing from that of the cylinder head and which is adapted to be connected to said cylinder head; and
   a sealing element which is disposed in said recess and forms a sealing surface between said cylinder head and said cylinder sleeve; at least that surface of said sealing element which faces said combustion chamber being provided with a heat insulating layer, said sealing element being a metal ring having a predetermined width, said heat insulating layer comprising a ceramic material, said cylinder sleeve, at that end adjacent said cylinder head, and on its radially inwardly directed surface, being provided with a heat insulating part which forms a contact surface for said heat insulating layer, said heat insulating part also comprising a ceramic material, said recess of said cylinder head having its outer periphery being wider than the width of said sealing element and said heat insulating layer forming a means to permit radial play of the sealing element via a spaced radial relationship.

2. An internal combustion engine according to claim 1, in which said ceramic material of said heat insulating layer is aluminum titanate ($Al_2TiO_5$).

3. An internal combustion engine according to claim 1, in which that surface of said heat insulating layer which faces said cylinder sleeve, and that surface of said heat insulating part which faces said cylinder head, have the same cross-sectional area.

4. An internal combustion engine according to claim 1, in which that surface of said heat insulating layer which is directed towards said combustion chamber is provided with a chamfering.

* * * * *